Patented Nov. 20, 1951

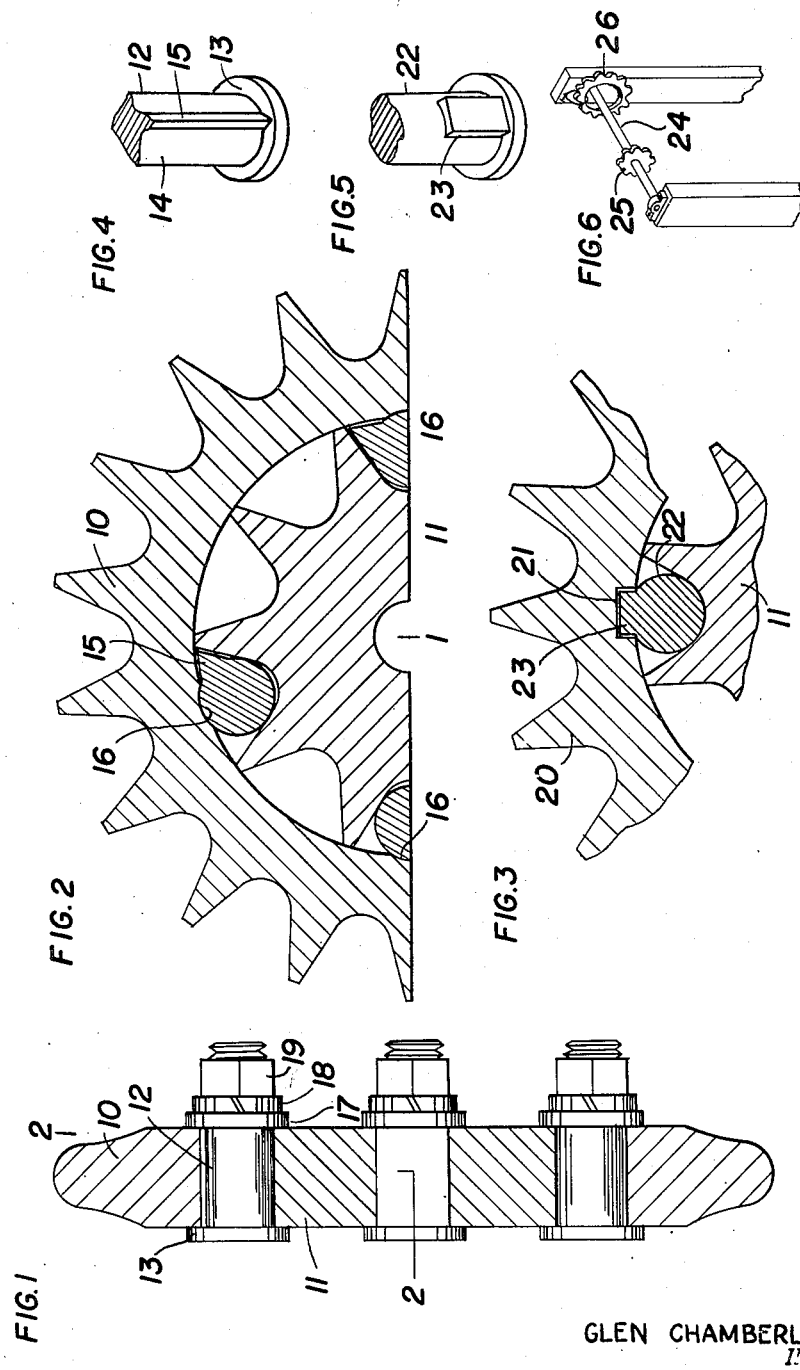

2,575,582

UNITED STATES PATENT OFFICE 2,575,582

ATTACHING MEANS FOR ADAPTER SPROCKETS

Glen Chamberlain, Wichita, Kans.

Application June 12, 1948, Serial No. 32,592

3 Claims. (Cl. 74—243)

This invention relates to sprocket type chain gearing, and more particularly to an adapter sprocket assembly for one or more sprockets of such chain gearing.

In such machines as wheat combines, oil well drilling rigs, etc. this type of chain gearing is used extensively, and it is often highly desirable that such equipment operate at a slower or faster speed than normal, due to unusual working or operating conditions. Since such equipment is not ordinarily provided with a variable speed transmission, the only way to obtain a speed change has been to remove one or more sprockets of the chain gearing and to replace them with sprockets having a different number of teeth. Since such sprockets are seldom readily accessible for removal a large number of other parts of the machine often have to be removed before such change in sprockets can be effected. Such work is costly from the standpoint of labor as well as from the standpoint of loss of machine operating time.

This invention comprises a simple ring type adapter sprocket which may be easily and quickly secured as a rim on a smaller sprocket to effectively change the number of teeth carried by the hub of the smaller sprocket. The invention further includes a means for easily and quickly securing the adapter sprocket on the smaller sprocket to prevent relative rotation and misalignment during subsequent operation of the chain gearing.

It is the chief object of the invention to provide an adapter sprocket assembly as generally described above which may be used in connection with sprocket type chain gearing to effectively change the speed at which the gearing operates.

It is a further object of the invention to provide a very simple means of installing such an adapter sprocket on a sprocket of chain gearing to effect a desired change in its speed of operation.

The construction of two preferred forms of the invention together with other objects attending its production will be more clearly understood when the accompanying description is read in connection with the accompanying drawings, in which:

Fig. 1 is a diametral cross sectional view through an adapter sprocket assembly embodying one form of the invention installed on a smaller sprocket;

Fig. 2 is a fragmentary side view of the Fig. 1 apparatus in section, the section being taken along the line 2—2 of Fig. 1;

Fig. 3 is a fragmentary side view of another adapter sprocket assembly embodying another form of the invention installed on a smaller sprocket, also shown fragmentarily;

Fig. 4 is a fragmentary isometric view of the locking bolt shown in Figs. 1 and 2, the threaded portion of the bolt being removed;

Fig. 5 is a similar view of the locking bolt shown in the Fig 3 embodiment; and

Fig. 6 is an isometric view of chain gearing machinery illustrating one manner of using the invention.

Referring to Figs. 1 and 2, it will be seen that the invention includes a ring type adapter sprocket 10, its internal diameter being of such size that the sprocket snugly encompasses a smaller sprocket 11, and fits on the smaller sprocket as a peripheral rim.

Bolts 12 project through the valleys between adjacent teeth of the smaller sprocket at spaced intervals. Each bolt is identical, and each has a flat head 13 of sufficient diameter that it overlies a portion of each sprocket when the bolt is in the position mentioned. Each bolt has a substantially cylindrical body portion 14 and an integral longitudinally extending lug 15 rendering the body portion irregular in cross sectional shape, as shown. In this particular embodiment of the invention it will be seen (Fig. 2) that the inside surface of the adapter sprocket 10 is arcuately cut away at intervals, as indicated by the numerals 16. These arcuate cut outs preferably have the same radius as the cylindrical portion of the bolts 12, and actually receive a part of such cylindrical portion when the bolt is in its locking position. It will be evident that the bolt is held against circumferential movement by the adjacent teeth of the smaller sprocket 11, and that the adapter sprocket 10 is held by the bolts 12 against circumferential movement with relation to the smaller sprocket.

The lug 15 of each bolt occupies a space defined by the point of one tooth of the smaller sprocket 11, and by the adjacent inside surface of the adapter sprocket.

With the bolts in their locking positions as shown in Figs. 1 and 2, a flat washer 17, a lock washer 18, and a nut 19 are all applied to the threaded ends of the bolts. The washers 17 are of substantially the same diameter as the heads of the bolts, so that they too overlie a portion of the adjacent side surface of each sprocket. When the nuts 19 are tightened the two sprockets are thus positively clamped into alignment with each other, and are also locked against relative rotation. The lugs 15 on the bolts contact at least one of the sprockets to prevent free rotation of the bolts while the nuts 19 are being tightened or loosened.

Referring now to Figs. 3 and 5, another embodiment of the invention will be described. It includes a similar adapter sprocket 20 adapted to be attached as a rim on the smaller sprocket 11. Instead of the arcuate cut away portions 16, the inside surface of this adapter sprocket has cut away portions 21 of any desired angular shape, such as rectangular, as shown.

Bolts 22 are identical to the previously described bolts 12, except that lugs 23 have a different cross-sectional shape—a shape which complementally fits the cut outs 21, as shown. The assembly and operation of the two embodiments is identical, and both serve the same purpose. The lug 23 contacts at least one of the sprockets and prevents rotation of the bolt during tightening and loosening of the nut. The bolt also projects into a cut out portion of the outer sprocket, and thus prevents relative rotation of the two sprockets.

Fig. 6 simply illustrates one manner in which this invention may be used. A shaft 24 and one sprocket 25 of conventional chain gearing is shown. In this case both ends of the shaft are journaled. In such a case an adapter sprocket 26 of a size to accomplish the desired change in speed is placed on the shaft before both its ends are mounted in the journals. This sprocket 26 may be wired to the journal support or to any other adjacent part of the machinery, as shown, so that it will not interfere in any way with the normal operation of the chain gearing. When it is desired to change the speed of operation, the machinery is simply stopped, and the adapter sprocket is installed on the smaller sprocket as above described. The required number of links are then added to the chain (not shown), in a manner well known to the art, and the machinery is ready to begin operation at a different speed.

From the above description it will be seen that this invention provides an easy means of changing the speed of operation of sprocket type chain gearing, as well as a new and simple means of attaching a ring type sprocket to a smaller sprocket to effect such a change in speed. Having described the invention with sufficient clarity to enable those familiar with this art to construct and use it, I claim:

1. In a sprocket assembly in which a ring type adapter sprocket is locked as a rim around a smaller sprocket, means for locking the two sprockets together comprising: a bolt passing through the valley between two adjacent teeth of the smaller sprocket, the bolt head overlying a portion of one side surface of each sprocket; an integral longitudinally disposed lug on the bolt shank having such a cross sectional shape as to substantially fill the space bounded by the adjacent surface of at least one of the said two teeth of the smaller sprocket, the adjacent surface of the adapter sprocket, and the bolt shank proper, the contact of said lug with the adjacent surface of at least one of said sprockets being adapted to prevent rotation of the bolt, and the bolt being adapted to prevent relative rotation of the sprockets; and a washer and nut for said bolt.

2. In a sprocket assembly in which a ring type adapter sprocket is locked as a rim around a smaller sprocket, the inside surface of the adapter sprocket having a recess at a point of locking, means for locking the two sprockets together comprising: a bolt passing through the valley between two adjacent teeth of the smaller sprocket, the bolt head overlying a portion of one side surface of each sprocket; an integral longitudinally disposed lug on the bolt shank having such a cross sectional shape as to substantially fill the valley between said two teeth and the adjacent recess in the adapter sprocket; and a washer and nut for the bolt.

3. In an adapter sprocket assembly in which a ring type adapter sprocket is secured as a rim around a smaller sprocket, the inside surface of the adapter sprocket having a recess at least one point, means for locking the two sprockets together comprising: a bolt passing through the valley between two adjacent teeth of the smaller sprocket, the bolt head overlying a portion of one side surface of each sprocket, the cross sectional shape of that portion of the bolt shank which lies between the two sprockets being such as to substantially fill the said valley between the two teeth and the adjacent recess in the adapter sprocket; and a washer and nut for said bolt.

GLEN CHAMBERLAIN.

REFERENCES CITED

The following references are of record in the file of this patent:

UNITED STATES PATENTS

| Number | Name | Date |
| --- | --- | --- |
| 550,541 | Simpson | Nov. 26, 1895 |
| 943,209 | White | Dec. 14, 1909 |
| 1,960,734 | Fassinger | May 29, 1934 |
| 2,258,225 | Shores | Oct. 7, 1941 |
| 2,258,513 | Martinek | Oct. 7, 1941 |
| 2,436,694 | Hornbrook, Jr. | Feb. 24, 1948 |

FOREIGN PATENTS

| Number | Country | Date |
| --- | --- | --- |
| 2,256 | Great Britain | 1892 |